United States Patent

Vivanco

(10) Patent No.: US 9,531,505 B1
(45) Date of Patent: Dec. 27, 2016

(54) DETERMINING AN AMOUNT OF HYBRID ARQ TRANSMISSIONS BASED ON A SERIES OF ACKNOWLEDGMENTS

(71) Applicant: Sprint Spectrum L.P., Overland Park, KS (US)

(72) Inventor: Daniel A. Vivanco, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 159 days.

(21) Appl. No.: 14/310,909

(22) Filed: Jun. 20, 2014

(51) Int. Cl.
*H04L 1/00* (2006.01)
*H04L 1/18* (2006.01)

(52) U.S. Cl.
CPC ........... *H04L 1/1858* (2013.01); *H04L 1/1864* (2013.01)

(58) Field of Classification Search
None
See application file for complete search history.

(56) References Cited

U.S. PATENT DOCUMENTS

| | | | |
|---|---|---|---|
| 6,308,294 B1 | 10/2001 | Ghosh et al. | |
| 6,631,127 B1 | 10/2003 | Ahmed et al. | |
| 6,697,987 B2 | 2/2004 | Lee et al. | |
| 6,925,132 B2 | 8/2005 | Song et al. | |
| 7,002,993 B1 | 2/2006 | Mohaban et al. | |
| 7,136,929 B2 | 11/2006 | Koprivica | |
| 7,206,280 B1 | 4/2007 | Khan et al. | |
| 7,388,919 B2 | 6/2008 | Varma et al. | |
| 7,447,968 B2 | 11/2008 | Ha et al. | |
| 7,715,347 B2 | 5/2010 | Yoon et al. | |
| 7,978,626 B1 | 7/2011 | Khanka et al. | |
| 8,958,383 B2 * | 2/2015 | Fu et al. | 370/329 |
| 9,137,814 B2 * | 9/2015 | Choi et al. | |
| 2004/0141525 A1 | 7/2004 | Bhushan et al. | |
| 2004/0179475 A1 | 9/2004 | Hwang et al. | |
| 2006/0013216 A1 | 1/2006 | Rajkotia et al. | |
| 2006/0109810 A1 | 5/2006 | Au et al. | |
| 2007/0070952 A1 | 3/2007 | Yoon et al. | |
| 2007/0091816 A1 | 4/2007 | Lee et al. | |
| 2007/0110095 A1 | 5/2007 | Attar et al. | |
| 2007/0168822 A1 | 7/2007 | Vitebsky et al. | |
| 2007/0214400 A1 | 9/2007 | Smith et al. | |
| 2007/0300120 A1 | 12/2007 | Kim et al. | |
| 2008/0130643 A1 | 6/2008 | Jain et al. | |

(Continued)

FOREIGN PATENT DOCUMENTS

WO 2007/059523 5/2007

OTHER PUBLICATIONS

3GPP Long Term Evolution (LTE), May 15, 2012, 4 pages, 4g-lte-world.blogspot.com/2012/05/tti-bundling-in-lte.html?m=1.

(Continued)

*Primary Examiner* — Chi H Pham
*Assistant Examiner* — Shick Hom

(57) ABSTRACT

A representation of a series of hybrid automatic repeat request (HARQ) acknowledgments may be obtained. Each HARQ acknowledgment in the series may have either positively or negatively acknowledged one or more HARQ subpackets that were consecutively transmitted from the RAN to a WCD. Based on at least the representation of the series of HARQ acknowledgments, an amount of HARQ subpackets to consecutively transmit to the WCD may be determined. The RAN may consecutively transmit the amount of HARQ subpackets to the WCD.

20 Claims, 6 Drawing Sheets

(56) References Cited

U.S. PATENT DOCUMENTS

| | | |
|---|---|---|
| 2008/0168321 A1 | 7/2008 | Lim et al. |
| 2008/0194284 A1 | 8/2008 | Choi et al. |
| 2009/0016265 A1 | 1/2009 | Katayama et al. |
| 2009/0129276 A1 | 5/2009 | Dendy |
| 2009/0319854 A1 | 12/2009 | Qian et al. |
| 2009/0327443 A1 | 12/2009 | Pawar et al. |
| 2010/0091735 A1 | 4/2010 | Kim et al. |
| 2010/0135156 A1 | 6/2010 | Sarkar |
| 2011/0038352 A1* | 2/2011 | Bergman et al. ............ 370/331 |
| 2012/0039227 A1 | 2/2012 | Chen et al. |
| 2012/0188947 A1* | 7/2012 | Larsson et al. ............... 370/328 |
| 2015/0237644 A1 | 8/2015 | Golitschek Edler von Elbwart et al. |

OTHER PUBLICATIONS

IEEE 802.16 Broadband Wireless Access Working Group <eee802.org/16>, Aggregated H-ARQ, Lim Geunhwi, et al., Nov. 3, 2004, 6 pages.

LTE Quick Reference, RSRP (References Signal Received Power), ShareTechnote, Jun. 6, 2014, 3 pages, sharetechnote.com/html/Handbook_LTE_RSRP.html.

LTE Quick Reference, TTI Bundling, ShareTechnote, Jun. 6, 2014, 2 pages, sharetechnote.com/html/Handbook_LTE_TTIBundling.html.

Sekhar, Expert Opinion, TTI Bundling in FDD and TD-LTE, Aug. 13, 2012, 4 pages, teuniversity.com/get_trained/expert_opinion1/b/sekhar/archive/2012/08/13/tti-bundling-in-fdd-and-td-lte.aspx.

* cited by examiner

400

| | A | B | C | D |
|---|---|---|---|---|
| 402 → | 1 | 4 | N/A | 1 |
| 404 → | 2 | 3 | N/A | 1 |
| 406 → | 3 | 2 | 3.5 | 4 |
| 408 → | 4 | 3 | 2.5 | 3 |
| | 5 | 2 | 2.5 | 3 |
| | 6 | 2 | 2.5 | 3 |
| | 7 | 4 | 2 | 2 |
| | 8 | 6 | 3 | 3 |
| | 9 | 5 | 5 | 5 |

| | A | B | C | D |
|---|---|---|---|---|
| 412 → | 1 | 4 | N/A | 1 |
| 414 → | 2 | 3 | N/A | 1 |
| 416 → | 3 | 2 | 2.2 | 3 |
| 418 → | 4 | 3 | 2.3 | 3 |
| | 5 | 2 | 4.1 | 5 |
| | 6 | 2 | 2.3 | 3 |
| | 7 | 4 | 3.3 | 4 |
| | 8 | 6 | 4.9 | 5 |
| | 9 | 5 | 4.6 | 5 |

Fig. 4B

DETERMINING AN AMOUNT OF HYBRID ARQ TRANSMISSIONS BASED ON A SERIES OF ACKNOWLEDGMENTS

BACKGROUND

Wireless networks may provide packet-based services to wireless communication devices (WCDs). For example, a radio access network (RAN) may define one or more wireless coverage areas through which the WCDs may obtain wireless communication services from the RAN. A particular WCD may communicate with the RAN via one or more of the RAN's base stations. In order to make this communication more efficient, for example, the RAN may derive one or more subpackets from a full packet to be transmitted to a WCD. The RAN may transmit at least one of these subpackets to the particular WCD. The particular WCD may transmit an acknowledgment (positive or negative) in response to each subpacket that it receives.

OVERVIEW

Communication networks in general, and wireless networks in particular, are subject to impairments that can lead to packet corruption and packet loss. For instance, a wireless signal can suffer from various types of attenuation, reflections, and/or interference. In order to address these problems, and to reduce the effective packet loss rate of a channel, forward error correction (FEC) schemes may be used.

FEC schemes permit a transmitting device, such as a base station, to transmit multiple copies of part or all of a packet to a client node, such as a WCD. Some copies may include FEC coding, for example XOR coding, Reed-Solomon coding, or turbo codes. If a WCD receives a packet with errors, it may be able to apply FEC codes contained within the packet, or contained within packets it has previously received or will subsequently receive, to properly decode the packet. In this way, packet error rates may be reduced.

One method of implementing FEC is through the use of hybrid automatic repeat request (HARQ). Using HARQ, a base station that seeks to transmit a full packet to a WCD may transmit one or more HARQ subpackets. The HARQ subpackets may be derived from the full packet, and therefore may contain copies of part or all of the full packet. Each HARQ subpacket may also contain an amount of FEC coding. The WCD may transmit a negative acknowledgment (N-ACK) in response to each HARQ subpacket it receives until the WCD can decode the full packet from the series of subpackets. Once the WCD is able to decode the full packet, it may transmit a positive acknowledgment (P-ACK) to the base station.

In some cases, a RAN may transmit several (e.g., 2-4 or more) HARQ subpackets to a WCD, and receive several N-ACKs before receiving a P-ACK. This may be due to the WCD being subject to poor wireless coverage and/or interference. Further, the RAN may wait several data slots to receive each N-ACK or P-ACK. If the RAN receives several N-ACKs for a particular HARQ subpacket before receiving a P-ACK for that HARQ subpacket, the RAN's transmission to the WCD may be delayed. Such delays are undesirable for any type of bearer traffic, but especially for real-time bearer traffic such as interactive voice or video.

One way to potentially reduce these delays is for the RAN to transmit, in consecutive data slots, several HARQ subpackets that were derived from the same full packet. The WCD may be able to combine the information from these HARQ subpackets such that the WCD can transmit a P-ACK to the RAN without any retransmissions, or with a limited number of retransmissions. In some implementations, this consecutive transmission of related HARQ subpackets may be referred to as transmission time interval (TTI) bundling.

Nonetheless, maintaining a static number of consecutively-transmitted HARQ subpackets per HARQ acknowledgment might not be efficient in all scenarios. For instance, if a WCD's wireless coverage quality is varying, dynamically adjusting the amount of consecutively-transmitted HARQ subpackets per HARQ acknowledgment for that WCD may result in even lower delays and more efficient use of wireless capacity. Particularly, interference from other WCDs sharing the same wireless coverage area, other WCDs served by nearby wireless coverage areas, or other sources, may be periodic or quasi-periodic in nature. By observing a series of HARQ acknowledgments from the WCD, the RAN may be able to determine a periodic or quasi-periodic pattern of P-ACKs and N-ACKs. In response, the RAN may adjust the amount of consecutively-transmitted HARQ subpackets per HARQ acknowledgment in future transmissions to the WCD.

Accordingly, in a first example embodiment, a representation of a series of hybrid automatic repeat request (HARQ) acknowledgments may be obtained. Each HARQ acknowledgment in the series may have either positively or negatively acknowledged one or more HARQ subpackets that were consecutively transmitted from the RAN to a WCD. Based on at least the representation of the series of HARQ acknowledgments, an amount of HARQ subpackets to consecutively transmit to the WCD may be determined. The RAN may consecutively transmit the amount of HARQ subpackets to the WCD.

A second example embodiment may include a non-transitory, computer-readable storage medium, having stored thereon program instructions that, upon execution by a computing device, cause the computing device to perform operations in accordance with the first example embodiment.

A third example embodiment may include a computing device containing at least a processor and data storage. The data storage may include program instructions that, when executed by the processor, cause the computing device to perform operations in accordance with the first example embodiment.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

BRIEF DESCRIPTION OF THE DRAWINGS

FIG. 4A illustrates a pattern of HARQ acknowledgments and associated TTI bundling, in accordance with an example embodiment.

FIG. 4B illustrates another pattern of HARQ acknowledgments and associated TTI bundling, in accordance with an example embodiment.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. Example Wireless Communication System

Figure 1:
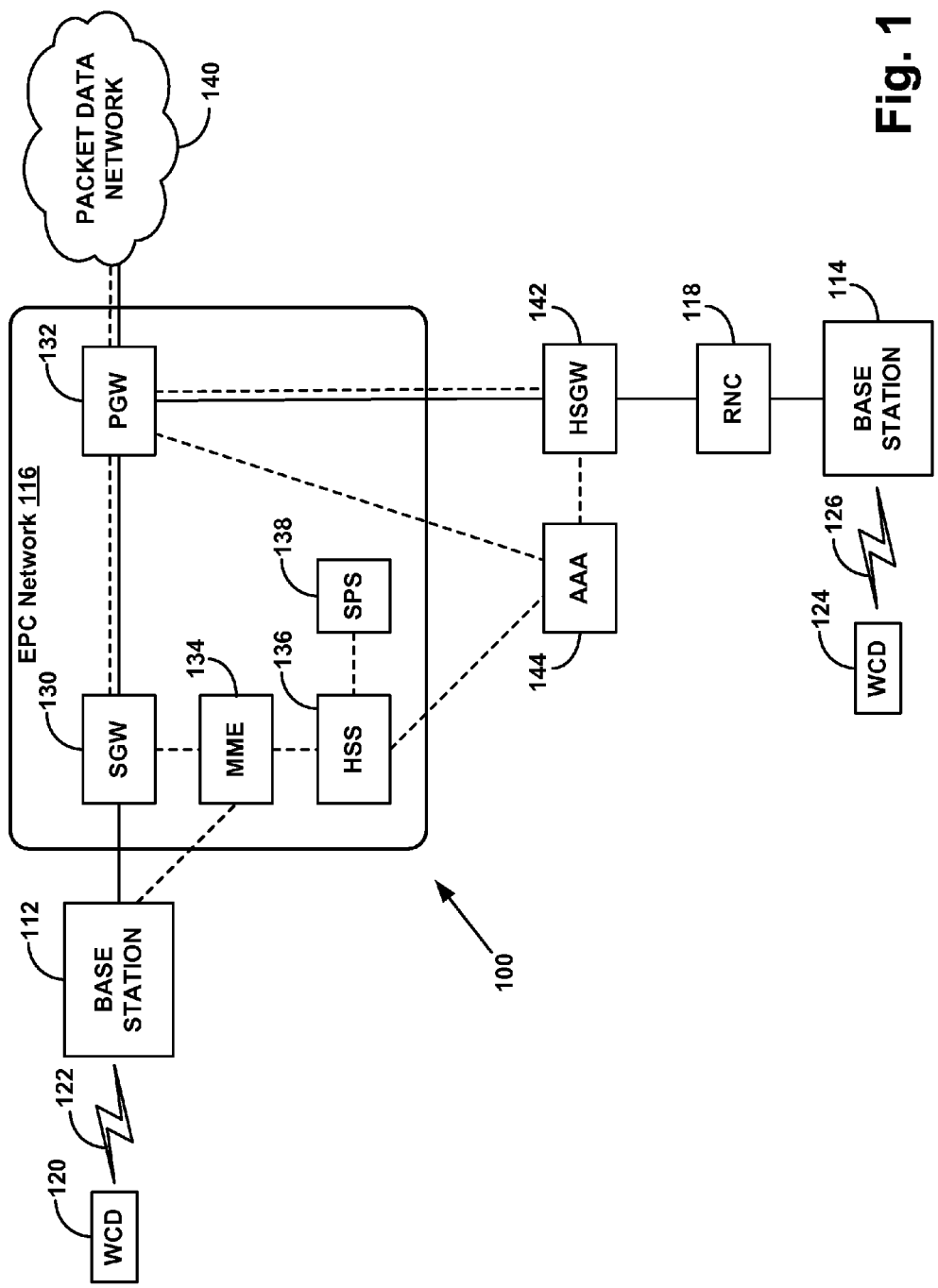
FIG. 1 is a block diagram of a wireless communication system, in accordance with an example embodiment.

FIG. 1 illustrates an example wireless communication system 100, which may be related to aspects of the present disclosure. In this example, wireless communication system 100 includes two different types of base stations, exemplified by base station 112 and base station 114. Base station 112 (e.g., an eNodeB) is part of an evolved RAN that uses an Evolved Packet Core (EPC) network 116. Base station 114 is part of a legacy RAN that includes a radio network controller (RNC) 118. Base stations 112 and 114 each provide one or more respective wireless coverage areas through which the respective base stations can communicate with one or more WCDs. The wireless coverage areas provided by base stations 112 and 114 could be either overlapping or non-overlapping.

A WCD may be referred to as user equipment (UE). Despite this nomenclature, a WCD need not be an end-user device, and may include various types of devices that have limited interactions with human users. For instance, WCDs 120 and 124 could be wireless telephones, wirelessly-equipped handheld, tablet, or laptop computers, or any other type of WCD.

In FIG. 1, connections that carry bearer traffic are indicated by solid lines, connections that carry signaling traffic are indicated by dashed lines, and connections that carry both bearer traffic and signaling traffic are indicated by solid lines in combination with dashed lines. However, both bearer and signaling traffic may be communicated using interfaces and/or paths not explicitly marked as such in FIG. 1.

As shown, base station 112 is in wireless communication with WCD 120 via an air interface 122, and base station 114 is in wireless communication with WCD 124 via an air interface 126. Each of air interfaces 122 and 126 may include forward direction channels for communication from the RAN to WCDs, and reverse direction channels for communication from the WCDs to the RAN.

Base stations 112 and 114 may communicate with WCDs using different air interface protocols. In one example, base station 112 communicates with WCDs, such as WCD 120, using a Long Term Evolution (LTE) protocol, whereas base station 114 communicates with WCDs, such as WCD 124, using a High Rate Packet Data (HRPD) protocol, such as Evolution Data-Only (EVDO). These air interface protocols, however, are given merely as illustrative examples. In general, base stations 112 and 114 may communicate using any air interface protocol that is known currently or may be developed.

As shown in FIG. 1, EPC network 116 includes a serving gateway (SGW) 130, a packet gateway (PGW) 132, a mobility management entity (MME) 134, a home subscriber server (HSS) 136, and a subscriber profile store (SPS) 138. PGW 132 may provide connectivity to a packet data network 140. SGW 130 may support the exchange of Internet Protocol (IP) bearer traffic between base station 112 and PGW 132. MME 134 may manage signaling traffic between base station 112 and various elements in EPC network 116, for example, relating to authentication of WCDs and activating and de-activating bearer connections for WCDs. HSS 136 may be configured to authenticate WCDs, as well as access subscriber profiles stored in SPS 138. For example, SPS 38 may store subscriber profiles for WCDs that are authorized to use EPC network 116.

With this configuration, EPC network 116 can provide packet data connections to packet data network 140 for WCDs served by base stations in an evolved RAN, for example, WCD 120 served by base station 112. The packet data connections that EPC network 116 provides to WCDs may, in turn, be used for Web access, email, text, voice-over-IP (VoIP), video, streaming media, gaming, and/or other packet data services.

In addition, EPC network 116 may provide packet data connections to packet data network 140 for WCDs served by other RANs, such as WCDs served by legacy RANs. In the example shown in FIG. 1, wireless communication system 100 includes an HRPD serving gateway (HSGW) 142 that supports interworking between EPC network 116 and a legacy RAN, the latter exemplified in FIG. 1 by base station 114 and RNC 118. This interworking may involve (i) HSGW 142 communicating with an authentication, authorization, and accounting (AAA) server 144, which, in turn, may communicate with HSS 136, and (ii) HSGW 142 communicating with PGW 132.

For example, WCD 124, when served by base station 114, may transmit a data-connection request that relates to establishing a packet data connection. HSGW 142 may receive the data-connection request via base station 114 and RNC 118, and, in response, communicate with AAA 144 to authenticate WCD 124. As part of the authentication process, AAA 144 may perform various functions, such as communicating with HSS 136, issuing an authentication challenge to WCD 124, evaluating a response from WCD 124 to the authentication challenge, and indicating to HSGW 142 whether the authentication process is successful or unsuccessful. If the authentication process is successful, HSGW 142 may communicate with PGW 132 to request a packet data connection to packet data network 140 for WCD 124. In response to the request from HSGW 142, PGW 132 may communicate with AAA 144 to authenticate WCD 124 in another authentication process. If that authentication process is successful, PGW 132 may establish the packet data connection, which then enables WCD 124 to communicate with packet data network 140 via air interface 126, base station 114, RNC 118, HSGW 142, and PGW 132.

In general, the depictions of FIG. 1 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting.

The arrangement of wireless communication system 100 and the processes described herein are set forth herein for purposes of example only. Other arrangements and elements (e.g., machines, interfaces, functions, orders of elements, etc.) can be added or used instead, and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

2. Example Computing Device

Figure 2:
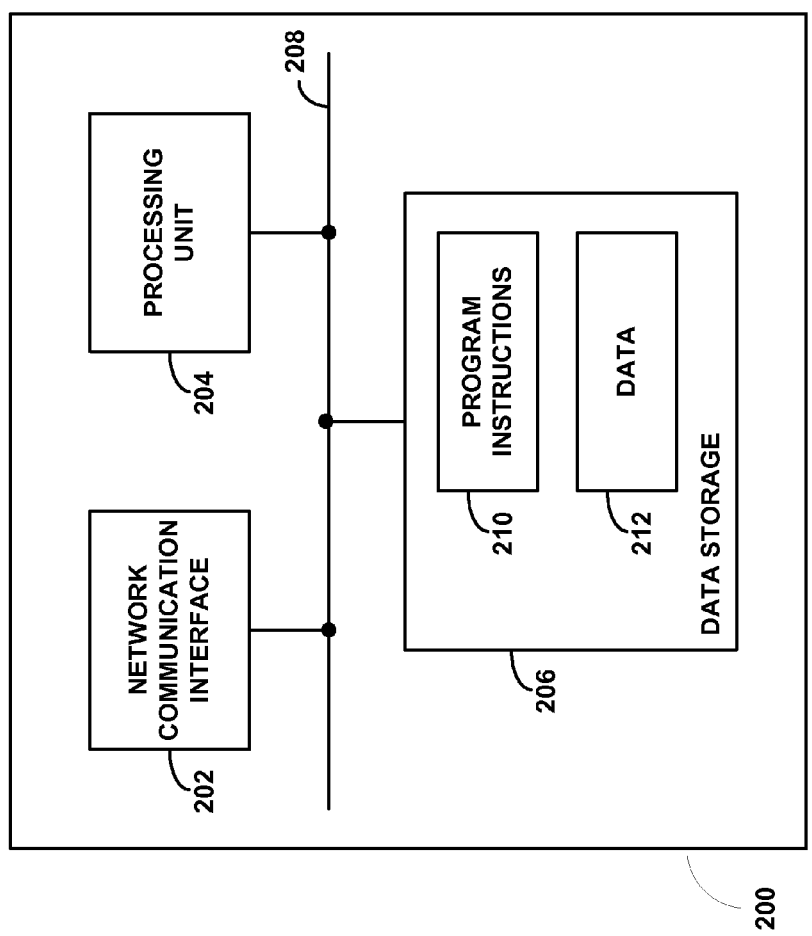
FIG. 2 is a block diagram of a computing device, in accordance with an example embodiment.

FIG. 2 is a block diagram of an example computing device 200. Computing device 200 could be a standalone general purpose or specialized computing device. Alternatively, computing device 200 could be a WCD or a part of the RAN. Thus, computing device 200 may represent a base station, MME, SGW, PGW, or some other type of RAN component or computer.

As shown, computing device 200 includes a network communication interface 202, a processing unit 204, and data storage 206, all of which may be communicatively linked together by a system bus, network, or other connection mechanism 208. Computing device 200 may also include additional components, functions and/or interfaces not shown in FIG. 2, such as a keyboard, a mouse, a touch screen, a monitor, a printer, and/or one or more ports that interface with such devices, for example a universal serial bus (USB) or high-definition multimedia interface (HDMI) port.

Network communication interface 202 may support communication with various other network entities, such as any of the network entities shown in FIG. 1. As such, interface 202 may include one or more network interface modules, such as Ethernet, Wifi, BLUETOOTH®, and/or wide-area wireless connection network interface modules, or any other type of wired and/or wireless communication interfaces.

Processing unit 204 may comprise one or more general purpose processors (e.g., microprocessors) and/or one or more special purpose processors (e.g., application specific integrated circuits, digital signal processors, and/or network processors). Data storage 206 may comprise one or more volatile and/or non-volatile non-transitory storage components, such as optical, magnetic, or flash storage, and may be integrated in whole or in part with processing unit 204.

As shown, data storage 206 may hold program instructions 210 and data 212. Program instructions 210 may be executable by processing unit 204 to carry out various functions described herein and/or depicted in the accompanying drawings. Data 212 could be any data that is generated, received, stored, or used in connection with carrying out such functions.

3. Example HARQ Communication

For purposes of illustration, this section describes examples of HARQ transmissions. These transmissions may take place between a base station, such as base station 112, and a WCD, such as WCD 120. In these examples, the base station transmits HARQ subpackets (possibly containing payload and/or FEC bits) to the WCD on a forward-direction channel, and the WCD transmits HARQ acknowledgments to the base station on a reverse direction channel.

Nonetheless, the procedures described herein may be carried out in other ways. For instance, the HARQ transmissions may take place between other types of devices. Alternatively, or additionally, the HARQ subpackets may be transmitted by a WCD on a reverse-direction channel and the HARQ acknowledgments may be transmitted by a base station on a forward-direction channel.

Figure 3:
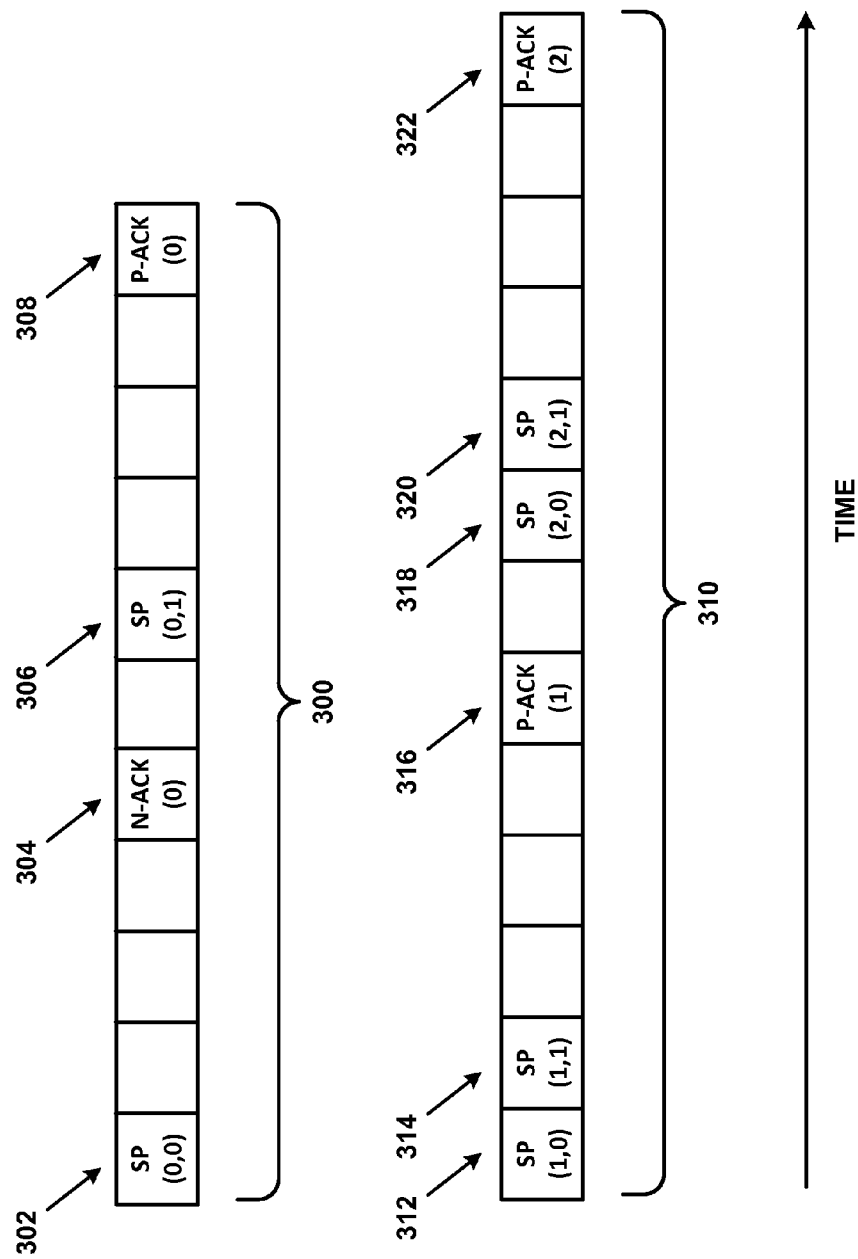
FIG. 3 illustrates HARQ transmissions, in accordance with an example embodiment.

FIG. 3 illustrates two sets of HARQ transmissions. In set 300, one HARQ subpacket per HARQ acknowledgment is transmitted. In set 310, TTI bundling is used to transmit two HARQ subpackets per HARQ acknowledgment. In each of set 300 and set 310, a box indicates a forward direction and/or reverse direction transmission slot. The yth HARQ subpacket transmission of the xth full packet is represented by a box containing a term SP(x,y). An N-ACK of the xth full packet is represented by a box containing a term N-ACK(x), and a P-ACK of the xth full packet is represented by a box containing the term P-ACK(x).

Additionally, set 300 and set 310 are represented from the point of view of the entity transmitting the HARQ subpackets (e.g., a base station). Thus, there is a propagation and processing delay of three slots between when a HARQ subpacket is transmitted and when its associated HARQ acknowledgment is received. Also, there is a processing delay of one slot between when a HARQ acknowledgment is received and the subsequent HARQ subpacket is transmitted.

FIG. 3, however, illustrates just two possible examples of HARQ transmissions. Other examples with more than two HARQ subpackets per HARQ acknowledgment, different propagation delays, and/or different processing delays may be possible.

In slot 302, HARQ subpacket SP(0,0) is transmitted. In slot 304, an N-ACK is received for this HARQ subpacket. HARQ subpacket SP(0,0) may have, for instance, been distorted during transmission or might not have arrived at its destination. Thus, in slot 306, HARQ subpacket SP(0,0) is transmitted.

HARQ subpacket SP(0,1) may be identical to HARQ subpacket SP(0,0). Alternatively, HARQ subpacket SP(0,1) may be different from HARQ subpacket SP(0,0), but derived from the same full packet as HARQ subpacket SP(0,0). For instance, HARQ subpacket SP(0,0) and HARQ subpacket SP(0,1) may have similar or the same payload bits, but different FEC bits. Throughout the examples herein, any HARQ subpacket SP(x,z) may be similarly related to a HARQ subpacket SP(x,y).

In slot 308, a P-ACK is received for HARQ subpacket SP(0,1). This may indicate that the recipient of HARQ subpacket SP(0,0) and HARQ subpacket SP(0,1) was able to derive full packet 0 from one or more of these HARQ subpackets.

Set 300 illustrates transmission of a full packet taking 11 slots rather than the best case of 4 slots. This additional delay can reduce the throughput of communication between the sender and recipient, and may also have a deleterious impact on real-time traffic (e.g., interactive audio, video, and/or gaming services) or near-real-time traffic (e.g., streaming audio or video services). Thus, it may be advantageous to reduce the extent of these delays.

One way of doing so may involve TTI bundling, as depicted in set 310. TTI bundling allows two or more HARQ subpackets to be transmitted per HARQ acknowledgment.

Therefore, while TTI bundling may use more slots for each HARQ subpacket/HARQ acknowledgment cycle, it also increases the likelihood that one or more of a related group of HARQ subpackets (e.g., one or more of SP(x,0), SP(x,1) . . . SP(x,n)) are successfully received. Thus, with TTI bundling activated, fewer HARQ subpacket/HARQ acknowledgment cycles per P-ACK may be used.

Set 310 illustrates transmission of HARQ subpackets with TTI bundling set to 2. Thus, two HARQ subpackets are transmitted for each HARQ acknowledgment. In slot 312, HARQ subpacket SP(1,0) is transmitted, and in slot 314 HARQ subpacket SP(1,1) is transmitted. In slot 316, a P-ACK is received for these HARQ subpackets. This may indicate that the recipient of HARQ subpacket SP(1,0) and HARQ subpacket SP(1,1) was able to derive full packet 1 from one or more of these HARQ subpackets.

Further, in slot 318, HARQ subpacket SP(2,0) is transmitted, and in slot 320 HARQ subpacket SP(2,1) is transmitted. In slot 322, a P-ACK is received for these HARQ subpackets. This may indicate that the recipient of HARQ subpacket SP(2,0) and HARQ subpacket SP(2,1) was able to derive full packet 2 from one or more of the HARQ subpackets.

Despite set 310 illustrating only P-ACKs, N-ACKs may also occur with TTI bundling. Such an N-ACK may result in each of the N-ACK'ed HARQ subpackets being retransmitted. Thus, for instance, if a N-ACK were received in slot 316, HARQ subpackets SP(1,0) and SP(1,1) may have been retransmitted in slots 318 and 320, respectively.

When using TTI bundling, a consideration is the number (i.e., amount) of HARQ subpackets to use per HARQ acknowledgment. For instance, if the recipient is a WCD in poor wireless coverage and/or a WCD conducting a voice call, it may be beneficial to set this number to 3 or 4, for example. However, in other situations, setting this number to 2, or even 1, may be sufficient. Using one HARQ subpacket per HARQ acknowledgment may be considered to be equivalent to deactivating TTI bundling.

Additionally, it may also be advantageous to dynamically adapt this extent of TTI bundling based on how network conditions change between the sender (e.g., base station) and recipient (e.g., WCD). For instance, if the sender is receiving a substantial number of N-ACKs for at least some groups of HARQ subpackets (e.g., an average of 2 or more), increasing the extent of TTI bundling may be warranted. On the other hand, if the extent of TTI bundling is high (e.g., 3 or 4 HARQ subpackets per HARQ acknowledgment), but the number of N-ACKs per group of HARQ subpackets is low (e.g., an average of less than 2), then reducing the extent of TTI bundling may be warranted.

Therefore, adjustments to the extent of TTI bundling may be made based on observed patterns of HARQ acknowledgments. In some embodiments, for instance, if an average of m or more HARQ acknowledgments are received per group of HARQ subpackets, the extent of TTI bundling may be increased. But if an average less than m HARQ acknowledgments are received per group of HARQ subpackets, the extent of TTI bundling may be decreased. The value of m may be for example, 1.5, 2, 2.5, 3, etc.

To facilitate these dynamic changes to the extent of TTI bundling, the sender may periodically, or from time to time, calculate the average number HARQ acknowledgments per group of HARQ subpackets. In some implementations, this calculation may take place more or less continuously, and may be triggered by the reception of each new HARQ acknowledgment. Further, in some cases, only the k most recent HARQ acknowledgments may be considered in this calculation. The value of k may be, for example, 1, 2, 3, 4, 8, etc.

Based on this data, a predictive model may be developed for the extent of TTI bundling to use in future HARQ transmissions. These models may vary from the simple to the complex, and may predict the extent of TTI bundling to use in one or more future HARQ subpacket/HARQ acknowledgment cycles. Further, these models may take into consideration one or more of (i) the values (e.g., N-ACK or P-ACK) of the k most recent HARQ acknowledgments, (ii) the number of HARQ subpackets per HARQ acknowledgment for each of these k HARQ acknowledgments, (iii) error values for past predictions made by the model, and possibly other factors as well.

The operations of two example models are provided below. However, it should be understood that these models and their respective operations are provided merely for purposes of illustration. Other types of models may be used, and any model may be used in other types of scenarios.

FIG. 4A provides an example of a model that, for HARQ subpacket/HARQ acknowledgment cycle n, the extent of TTI bundling is based on the average number of HARQ acknowledgments observed for HARQ subpacket/HARQ acknowledgment cycles n-1 and n-2.

In FIG. 4A, column A of chart 400 represents the number of the HARQ subpacket/HARQ acknowledgment cycle (e.g., column A may also represent a time slot containing the HARQ acknowledgment of a HARQ subpacket/HARQ acknowledgment cycle). Column B represents the number of HARQ acknowledgments observed for the associated HARQ subpacket/HARQ acknowledgment cycle. Column C represents the average number of HARQ acknowledgments observed for the previous two HARQ subpacket/HARQ acknowledgment cycles. Column D represents the extent of TTI bundling to use for the associated HARQ subpacket/HARQ acknowledgment, which is also the value of the associated HARQ acknowledgments entry in column C rounded up.

Accordingly, entry 402 indicates that, for the first HARQ acknowledgment, 4 HARQ subpackets were transmitted. It is assumed that the model has no data from previous entries, so column C for this entry does not have a value. Therefore, a default extent of TTI bundling may be used. As shown in Column D for this entry, a default extent of 1 may be chosen (indicating that one HARQ subpacket per HARQ acknowledgment will be transmitted.

Entry 404 indicates that, for the second HARQ acknowledgment, 3 HARQ subpackets were transmitted. Because the model has data from only one previous entry, column C for this entry does not have a value. Therefore, a default extent of 1 may be chosen for column D.

Entry 406 indicates that, for the third HARQ acknowledgment, 2 HARQ subpackets were transmitted. This entry is the first for which the average number of HARQ acknowledgments observed for the previous two HARQ subpacket/HARQ acknowledgment cycles can be calculated. Thus, column C contains a value of 3.5 and column D contains a value of 4. Similarly, entry 408 indicates that, for the fourth HARQ acknowledgment, 3 HARQ subpackets were transmitted. Column C contains a value of 2.5 and column D contains a value of 3.

The values in the remaining entries of chart 400 may be determined in a similar fashion. In this way, the sender and recipient may dynamically adapt to changing wireless channel characteristics. In some embodiments, the sender (e.g., a RAN) may perform the calculations associated with chart 400, and may indicate to the recipient (e.g., a WCD) how many HARQ subpackets to expect for each HARQ subpacket/HARQ acknowledgment cycle. In other embodiments, both the sender and the recipient may perform these calculations so that they each independently determine how many HARQ subpackets to expect for each HARQ subpacket/HARQ acknowledgment cycle.

In some situations, interference from other WCDs sharing the same wireless coverage area, other WCDs served by nearby wireless coverage areas, or other sources may be periodic or quasi-periodic in nature. By observing a series or pattern of HARQ acknowledgments from the WCD, the RAN may be able to determine a periodic or quasi-periodic pattern of P-ACKs and N-ACKs. In response, the RAN may adjust the amount of consecutively-transmitted HARQ subpackets per HARQ acknowledgment in future transmissions to the WCD. Particularly, the RAN and/or WCD may use a model of the observed HARQ acknowledgments that may be able to capture some extent of this periodicity.

FIG. 4B provides an example of a model that, for HARQ subpacket/HARQ acknowledgment cycle n, the extent of TTI bundling is based on an autoregressive model of HARQ acknowledgments observed for HARQ subpacket/HARQ acknowledgment cycles n-1 and n-2.

An autoregressive model can be used to represent data of a time series, where the value of the nth entry depends linearly on at least some of the t previous entries, for n>t. Formally:

$$X_n = \sum_{i=1}^{t} a_i X_{n-i} + c$$

The parameters of an autoregressive model are $a_1 \ldots a_t$ and c. As an example, an order 2 autoregressive model can be expressed as:

$$X_n = a_1 X_{n-1} + a_2 X_{n-2} + c$$

For a particular autoregressive model to be used, the model is trained with time series data, and from this data the parameters may be derived. There are several methods that can be used to derive the parameters, such as the least-squares technique, the Yule-Walker equations, or a maximum likelihood estimation. Regardless, once the parameters are found, the autoregressive model may be used to predict future values of the time series. An autoregressive model may be able to capture, or otherwise represent, the periodicity of the time series with which it was trained.

Similar to the format of chart 400, column A of chart 410 represents the number of the HARQ subpacket/HARQ acknowledgment cycle. Column B represents the number of HARQ acknowledgments observed for the associated HARQ subpacket/HARQ acknowledgment cycle. Column C represents the predicted number of HARQ acknowledgments based on an order 2 autoregressive model of previous HARQ subpacket/HARQ acknowledgment cycles. Column D represents the extent of TTI bundling to use for the associated HARQ subpacket/HARQ acknowledgment, which is also the value of the associated HARQ acknowledgments entry in column C rounded up.

As an illustrative example, the order 2 autoregressive model used for the data in column C is:

$$X_n = 0.81254 X_{n-1} - 0.93754 X_{n-2} + 3.5$$

However, additional autoregressive models, including autoregressive models of orders other than 2, may be used instead.

Regardless, entries 412 and 414, like entries 402 and 404 of chart 400, result in a default extent of TTI bundling being used because the autoregressive model does not have enough data. Entry 416 indicates that, for the third HARQ acknowledgment, 2 HARQ subpackets were transmitted. This entry is the first for which the order 2 autoregressive model can be used. Thus, column C contains a value of 2.2 and column D contains a value of 3. Similarly, entry 418 indicates that, for the fourth HARQ acknowledgment, 3 HARQ subpackets were transmitted. Column C contains a value of 2.3 and column D contains a value of 3.

The values in the remaining entries of chart 410 may be determined in a similar fashion. In this way, the sender and recipient may dynamically adapt to changing wireless channel characteristics. In some embodiments, the sender (e.g., a RAN) may perform the calculations associated with chart 410, and may indicate to the recipient (e.g., a WCD) how many HARQ subpackets to expect for each HARQ subpacket/HARQ acknowledgment cycle. In other embodiments, both the sender and the recipient may perform these calculations so that they each independently determine how many HARQ subpackets to expect for each HARQ subpacket/HARQ acknowledgment cycle.

Also, the sender and/or recipient may update the model periodically or from time to time. For instance, one or both of these entities may re-calculate the parameters of an autoregressive model every ith HARQ subpacket/HARQ acknowledgment cycle, where i may be 2, 4, 8, 16, etc., or any other value greater than or equal to 1.

In some embodiments, the extent of TTI bundling may also be based on the strength at which the WCD receives signals from the RAN. For instance, if the WCD reports receiving a high signal strength from the RAN, the RAN may transmit fewer HARQ subpackets per HARQ acknowledgment. But if the WCD reports receiving a low signal strength from the RAN, the RAN may transmit more HARQ subpackets per HARQ acknowledgment. For instance, a report of received signal strength may be used to increase (when the received signal strength is low) or decrease (when the received signal strength is high) the values in column D of FIGS. 4A and 4B.

One way in which a WCD may report signal quality in an LTE system is by transmitting a channel quality indication (CQI) in the reverse direction. A CQI report may be carried by a physical uplink control channel (PUCCH) or a physical uplink shared channel (PUSCH) of the air interface.

The CQI report may contain a number between 1 and 15 that represents signal quality. The higher this value, the higher the modulation scheme coding rate that the base station may use in subsequent forward direction transmissions (e.g., 2 bits per symbol with quadrature phase-shift keying (QPSK), 4 bits per symbol with 16-point quadrature amplitude modulation (16QAM), 6 bits per symbol with 64-point quadrature amplitude modulation (64QAM), etc.). Higher CQI signal quality numbers may also indicate more symbols transmitted per data slot.

TABLE 1

CQI values and transmission rates.

| CQI Value | Modulation | Approximate Transmission Rate |
|---|---|---|
| 0 | N/A | 0 |
| 1 | QPSK | 159 kilobits per second |
| 2 | QPSK | 245 kilobits per second |
| 3 | QPSK | 395 kilobits per second |
| 4 | QPSK | 641 kilobits per second |
| 5 | QPSK | 920 kilobits per second |
| 6 | QPSK | 1.2 megabits per second |
| 7 | 16 QAM | 1.5 megabits per second |
| 8 | 16 QAM | 2.0 megabits per second |

TABLE 1-continued

CQI values and transmission rates.

| CQI Value | Modulation | Approximate Transmission Rate |
|---|---|---|
| 9 | 16 QAM | 2.5 megabits per second |
| 10 | 64 QAM | 2.9 megabits per second |
| 11 | 64 QAM | 3.5 megabits per second |
| 12 | 64 QAM | 4.1 megabits per second |
| 13 | 64 QAM | 4.7 megabits per second |
| 14 | 64 QAM | 5.3 megabits per second |
| 15 | 64 QAM | 5.8 megabits per second |

As an example, Table 1 provides a mapping between CQI values and bitrates. In Table 1, each CQI value from 1-15 is associated with a type of modulation (QPSK, 16QAM, or 64QAM). Each CQI value may also be associated with a transmission rate, from 159 kilobits per second for a CQI value of 1 to 5.8 megabits per second for a CQI value of 15. A CQI value of 0 may indicate that the WCD is receiving no signal, or negligible signal strength from the RAN.

Table 1 is just one possible example of a mapping between CQI values and transmission rates. Other mappings are possible that use different CQI values and/or different transmission rates. Additionally, other types of signal quality measurement reports may be used, instead of or in addition to CQI reports. For instance, in CDMA systems, active set measurement reports or neighbor reports may be used instead.

4. Example Operations

Figure 5:
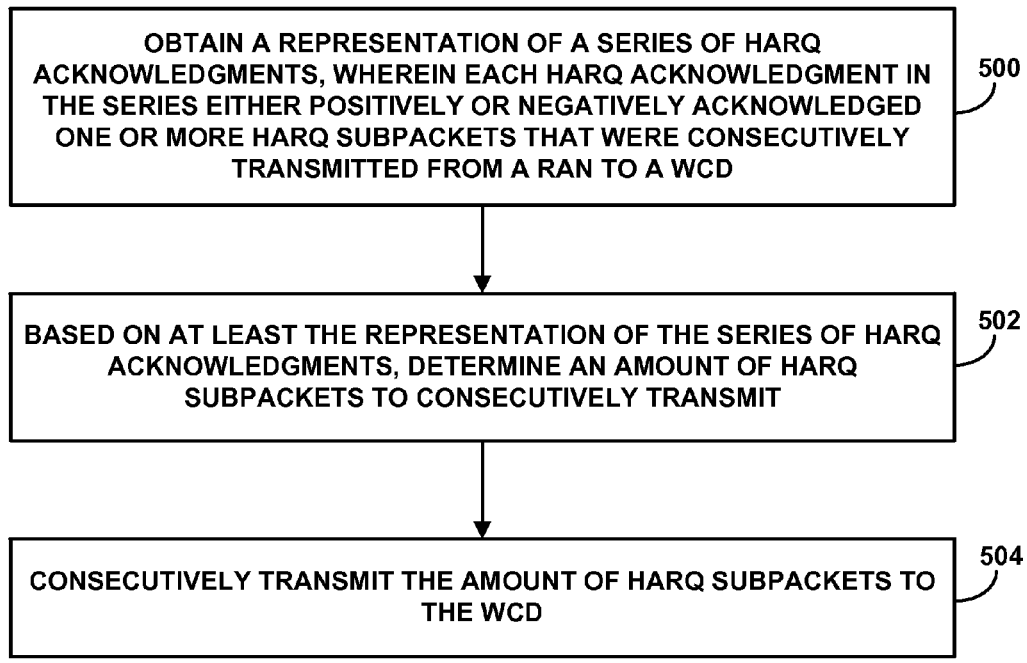
FIG. 5 is a flow chart, in accordance with an example embodiment.

FIG. 5 is a flow chart in accordance with an example embodiment. The operations illustrated by this flow chart may be carried out by a computing device, such as computing device 200. In some embodiments, computing device 200 may represent a WCD and/or a RAN device, such as a base station.

At block 500 of FIG. 5, a representation of a series of HARQ acknowledgments may be obtained. Each HARQ acknowledgment in the series may have either positively or negatively acknowledged one or more HARQ subpackets that were consecutively transmitted from the RAN to a WCD.

At block 502, based on at least the representation of the series of HARQ acknowledgments, an amount of HARQ subpackets to consecutively transmit to the WCD (e.g., the extent of TTI bundling) may be determined. At block 504, the amount of HARQ subpackets may be consecutively transmitted to the WCD.

In some embodiments, a second representation of a second series of HARQ acknowledgments may also be obtained. Each HARQ acknowledgment in the second series may have either positively or negatively acknowledged one or more HARQ subpackets that were consecutively transmitted from the RAN to the WCD. Based on at least the second representation of the second series of HARQ acknowledgments, a second amount of HARQ subpackets to consecutively transmit to the WCD may be determined. The second amount of HARQ subpackets may be consecutively transmitted to the WCD.

The series of HARQ acknowledgments and the second series of HARQ acknowledgments may partially overlap. In some embodiments, determining the amount of HARQ subpackets to consecutively transmit to the WCD may be based on an autoregressive model of the series of HARQ acknowledgments. On the other hand, a different statistical prediction model may be used. An autoregressive model (or another statistical prediction model) may also be used to determine the second amount of HARQ subpackets to consecutively transmit to the WCD.

Alternatively or additionally, the amount of HARQ subpackets to consecutively transmit to the WCD may be greater than 1, and determining the amount of HARQ subpackets to consecutively transmit to the WCD may also be based on the WCD receiving signals from the RAN below a low threshold strength. Thus, when the WCD reports receiving a low signal strength from the RAN, the RAN may transmit more HARQ subpackets per HARQ acknowledgment.

In some cases, the amount of HARQ subpackets to consecutively transmit to the WCD may be greater than 2, and determining the amount of HARQ subpackets to consecutively transmit to the WCD may also be based on the WCD receiving signals from the RAN below a second low threshold strength. The second low threshold strength may be less than the low threshold strength. Thus, when the WCD reports receiving an even lower signal strength from the RAN, the RAN may transmit even more HARQ subpackets per HARQ acknowledgment.

Further, the amount of HARQ subpackets to consecutively transmit to the WCD may be 1, and determining the amount of HARQ subpackets to consecutively transmit to the WCD may also be based on the WCD receiving signals from the RAN above a high threshold strength. Thus, when the WCD reports receiving a high signal strength from the RAN, the RAN may transmit fewer HARQ subpackets per HARQ acknowledgment.

Moreover, it may be determined that a second WCD receives signals from the RAN at approximately the same strength that the WCD receives signals from the RAN. For instance, the second WCD may report a CQI value that is one or two units different from the CQI value reported by the WCD. Based on the second WCD receiving signals from the RAN at approximately the same strength that the WCD receives signals from the RAN, the RAN may consecutively transmit the same amount of HARQ subpackets to the second WCD. Determining that the second WCD receives signals from the RAN at approximately the same strength that the WCD receives signals from the RAN may involve (a) determining a strength at which the WCD receives signals from the RAN, (b) determining a second strength at which the second WCD receives signals from the RAN, and (c) determining that a difference between the strength and the second strength is less than a threshold difference (e.g., the WCDs have reported CQI values within 1-2 units of each other). In this way, the same extent of TTI bundling may be used for two WCDs that are experiencing similar wireless conditions, and calculations used to model HARQ acknowledgment patterns for these WCDs might not need to be performed for each WCD.

5. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Further, as an aid to understanding, the following appended claims may contain usage of the introductory phrases "at least one" or "one or more" to introduce claim recitations. However, the use of such phrases should not be construed to imply that the introduction of a claim recitation by the indefinite articles "a" or "an" limits any particular claim containing such a claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

Moreover, any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    obtaining, by a radio access network (RAN) device of a RAN, a representation of a series of hybrid automatic repeat request (HARQ) acknowledgments, wherein each HARQ acknowledgment in the series either positively or negatively acknowledged one or more HARQ data subpackets that were consecutively transmitted from the RAN to a wireless communication device (WCD);
    based on at least a pattern in the representation of the series of HARQ acknowledgments, determining an amount of HARQ data subpackets to consecutively transmit to the WCD; and
    consecutively transmitting, by the RAN, the amount of HARQ data subpackets to the WCD.

2. The method of claim 1, further comprising:
    obtaining a second representation of a second series of HARQ acknowledgments, wherein each HARQ acknowledgment in the second series either positively or negatively acknowledged one or more HARQ data subpackets that were consecutively transmitted from the RAN to the WCD;
    based on at least a second pattern in the second representation of the second series of HARQ acknowledgments, determining a second amount of HARQ data subpackets to consecutively transmit to the WCD; and
    consecutively transmitting, by the RAN, the second amount of HARQ data subpackets to the WCD.

3. The method of claim 2, wherein the series of HARQ acknowledgments and the second series of HARQ acknowledgments partially overlap.

4. The method of claim 1, wherein determining the amount of HARQ data subpackets to consecutively transmit to the WCD is based on an autoregressive model of the series of HARQ acknowledgments.

5. The method of claim 1, wherein the amount of HARQ data subpackets to consecutively transmit is greater than 1, and wherein determining the amount of HARQ data subpackets to consecutively transmit to the WCD is also based on the WCD receiving signals from the RAN below a low threshold strength.

6. The method of claim 5, wherein the amount of HARQ data subpackets to consecutively transmit is greater than 2, wherein determining the amount of HARQ data subpackets to consecutively transmit to the WCD is also based on the WCD receiving signals from the RAN below a second low threshold strength, and wherein the second low threshold strength is less than the low threshold strength.

7. The method of claim 1, wherein the amount of HARQ data subpackets to consecutively transmit is 1, and wherein determining the amount of HARQ data subpackets to consecutively transmit to the WCD is also based on the WCD receiving signals from the RAN above a high threshold strength.

8. The method of claim 1, further comprising:
determining that a second WCD receives signals from the RAN at approximately a same strength that the WCD receives signals from the RAN; and
based on the second WCD receiving signals from the RAN at approximately the same strength that the WCD receives signals from the RAN, consecutively transmitting the amount of HARQ data subpackets to the second WCD.

9. The method of claim 8, wherein determining that the second WCD receives signals from the RAN at approximately the same strength that the WCD receives signals from the RAN comprises:
determining a strength at which the WCD receives signals from the RAN;
determining a second strength at which the second WCD receives signals from the RAN; and
determining that a difference between the strength and the second strength is less than a threshold difference.

10. An article of manufacture including a non-transitory computer-readable medium, having stored thereon program instructions that, upon execution by a radio access network (RAN) device of a RAN, cause the RAN device to perform operations comprising:
obtaining a representation of a series of hybrid automatic repeat request (HARQ) acknowledgments, wherein each HARQ acknowledgment in the series either positively or negatively acknowledged one or more HARQ data subpackets that were consecutively transmitted from the RAN to a wireless communication device (WCD);
based on at least a pattern in the representation of the series of HARQ acknowledgments, determining an amount of HARQ data subpackets to consecutively transmit to the WCD; and
consecutively transmitting the amount of HARQ data subpackets to the WCD.

11. The article of manufacture of claim 10, wherein the operations further comprise:
obtaining a second representation of a second series of HARQ acknowledgments, wherein each HARQ acknowledgment in the second series either positively or negatively acknowledged one or more HARQ data subpackets that were consecutively transmitted from the RAN to the WCD;
based on at least a second pattern in the second representation of the second series of HARQ acknowledgments, determining a second amount of HARQ data subpackets to consecutively transmit to the WCD; and
consecutively transmitting the second amount of HARQ data subpackets to the WCD.

12. The article of manufacture of claim 11, wherein the series of HARQ acknowledgments and the second series of HARQ acknowledgments partially overlap.

13. The article of manufacture of claim 10, wherein determining the amount of HARQ data subpackets to consecutively transmit to the WCD is based on an autoregressive model of the series of HARQ acknowledgments.

14. The article of manufacture of claim 10, wherein the amount of HARQ data subpackets to consecutively transmit to the WCD is greater than 1, and wherein determining the amount of HARQ data subpackets to consecutively transmit is also based on the WCD receiving signals from the RAN below a low threshold strength.

15. The article of manufacture of claim 14, wherein the amount of HARQ data subpackets to consecutively transmit to the WCD is greater than 2, wherein determining the amount of HARQ data subpackets to consecutively transmit to the WCD is also based on the WCD receiving signals from the RAN below a second low threshold strength, and wherein the second low threshold strength is less than the low threshold strength.

16. The article of manufacture of claim 10, wherein the amount of HARQ data subpackets to consecutively transmit to the WCD is 1, and wherein determining the amount of HARQ data subpackets to consecutively transmit to the WCD is also based on the WCD receiving signals from the RAN above a high threshold strength.

17. The article of manufacture of claim 10, wherein the operations further comprise:
determining that a second WCD receives signals from the RAN at approximately a same strength that the WCD receives signals from the RAN; and
based on the second WCD receiving signals from the RAN at approximately the same strength that the WCD receives signals from the RAN, consecutively transmitting the amount of HARQ data subpackets to the second WCD.

18. The article of manufacture of claim 17, wherein determining that the second WCD receives signals from the RAN at approximately the same strength that the WCD receives signals from the RAN comprises:
determining a strength at which the WCD receives signals from the RAN;
determining a second strength at which the second WCD receives signals from the RAN; and
determining that a difference between the strength and the second strength is less than a threshold difference.

19. A radio access network (RAN) device of a RAN, the RAN device comprising:
at least one processor;
data storage; and
program instructions, stored in the data storage, that upon execution by the at least one processor cause the RAN device to perform operations comprising:
obtaining a representation of a series of hybrid automatic repeat request (HARQ) acknowledgments, wherein each HARQ acknowledgment in the series either positively or negatively acknowledged one or more HARQ data subpackets that were consecutively transmitted from the RAN to a wireless communication device (WCD);

based on at least a pattern in the representation of the series of HARQ acknowledgments, determining an amount of HARQ data subpackets to consecutively transmit to the WCD; and consecutively transmitting the amount of HARQ data subpackets to the WCD.

20. The RAN device of claim 19, wherein the operations further comprise:

determining that a second WCD receives signals from the RAN at approximately a same strength that the WCD receives signals from the RAN; and based on the second WCD receiving signals from the RAN at approximately the same strength that the WCD receives signals from the RAN, consecutively transmitting the amount of HARQ data subpackets to the second WCD.

* * * * *